(12) United States Patent
Steinberger et al.

(10) Patent No.: US 6,318,205 B1
(45) Date of Patent: Nov. 20, 2001

(54) LOCKING LEVER FOR A SHIFT ROCKER

(75) Inventors: Wolfgang Steinberger, Herzogenaurach; Klaus Krämer, Baudenbach; Arnold Trissler, Herzogenaurach, all of (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/553,994

(22) Filed: Apr. 20, 2000

(30) Foreign Application Priority Data

Apr. 28, 1999 (DE) .............................. 199 19 269

(51) Int. Cl.$^7$ .................................... B60K 20/00
(52) U.S. Cl. ...................... 74/473.37; 74/473.36
(58) Field of Search .............. 74/473.37, 473.36, 74/473.1, 471 R, 335

(56) References Cited

U.S. PATENT DOCUMENTS

| | | | |
|---|---|---|---|
| H295 | * | 7/1987 | Numazawa et al. ............... 74/473 R |
| 5,471,893 | * | 12/1995 | Newbigging ........................ 74/335 |
| 5,802,916 | | 9/1998 | Ebinger et al. . |
| 6,038,938 | * | 3/2000 | Szczepanski et al. ............ 74/473.24 |
| 6,122,983 | * | 9/2000 | Hoffman ............................ 74/337.5 |

FOREIGN PATENT DOCUMENTS

| | | |
|---|---|---|
| PS 9 41 713 | 10/1955 | (DE) . |
| 24 56 962 A1 | 6/1975 | (DE) . |
| 196 09 210 C1 | 7/1997 | (DE) . |

* cited by examiner

*Primary Examiner*—David Fenstermacher
(74) *Attorney, Agent, or Firm*—Henry M. Feiereisen

(57) ABSTRACT

A shift device for a change-speed gearbox, includes a plurality of shift rockers, each shift rocker being supported in a pivot bearing and rotatable by actuating a shift finger, fixedly mounted on a shift shaft. The shift rockers are provided to axially displace respectively connected shift sleeves, whereby a locking unit is operatively connected via locking levers to the shift rockers to lock those shift rockers that are not activated. Each locking lever has one end of curved configuration which terminates in a cylindrical pin for engagement in a recess of the associated shift rocker, wherein the cylindrical pin is captivated within the recess of the shift rocker by impressing boundary regions of the recess.

12 Claims, 4 Drawing Sheets

LOCKING LEVER FOR A SHIFT ROCKER

CROSS-REFERENCES TO RELATED APPLICATIONS

This application claims the priority of German Patent Application, Serial No. 199 19 269.3, filed Apr. 28, 1999, the subject matter of which is incorporated herein by reference.

BACKGROUND OF THE INVENTION

The present invention relates, in general, to a shift device of a change-speed gearbox of motor vehicles.

A change-speed gearbox has an input shaft and coaxial thereto an output shaft, as well as a countershaft in parallel disposition thereto. Shift rockers are used in the change-speed gearbox to axially displace shift sleeves that interact with gear wheel clutches for optionally coupling either the input shaft with the output shaft or the countershaft, whereby a locking device locks non-activated shift rockers via respectively connected locking rods.

U.S. Pat. No. 5,802,916, issued on Sep. 8, 1998, describes a shift device in which the locking device is operatively connected to the shift rocker by a locking rod in the form of a lever made from flat steel strip or flat iron. The locking lever is swingably mounted to a bracket of the shift rocker, whereby the bracket is a separate component which is formed integrally with the shift rocker and directed radially outwards. The securement of the locking lever to the bracket is implemented by a screws or rivets at a clearance to permit a swingable disposition of the locking lever. The need for many components to realize operation and function of the locking lever is a drawback of this conventional shift device for many reasons. The bracket is formed integrally with the shift rocker through a material-linking process such as welding which results in undesired local heat introduction that adversely affects the configuration and strength of the shift rocker. Moreover, the hinged attachment of the locking lever to the bracket by means of screws, rivets or bolts, requires an effective permanent securement.

SUMMARY OF THE INVENTION

It is thus an object of the present invention to provide an improved locking lever for a locking device, obviating the afore-stated drawbacks.

In particular, it is an object of the present invention to provide an improved locking lever for a locking device, which is implemented by a reduced number of components and yet is reliably and permanently secured to the shift rocker.

These objects, and others which will become apparent hereinafter, are attained in accordance with the present invention by providing a plurality of shift rockers rotatable between an activated position and a non-activated position, with each shift rocker being supported in a pivot bearing and activated through operation of a shift finger, which is fixedly mounted on a shift shaft, for axially displacing shift sleeves; a locking unit; and a plurality of locking levers operatively connecting the locking unit to the shift rockers and so operated as to lock the non-activated shift rockers, each said locking lever having one end exhibiting a curved configuration and terminating in a cylindrical pin for engagement in a recess of the associated shift rocker, with the cylindrical pin being held in place within the recess by impressing surrounding boundary regions of the shift rocker.

In accordance with a preferred embodiment of the present invention, the cylindrical pin may be press-fitted in the locking lever to thereby, in effect, form with the locking lever a structural unit. The locking lever is thus directly secured to the shift rocker so that the need for a separate bracket and a separate screw connection for attaching the locking lever to the bracket are no longer needed, thereby reducing the number of components. The recess in the shift rocker for receiving the locking lever and the cylindrical pin can suitably be made during manufacture of the shift rocker, thereby eliminating the need for a separate production step or a separate chucking. No longer is there any requirement for separate welding processes so that problems associated with welding as a consequence of local heating are not an issue. As the installation is simplified in view of the reduced number of components, the overall shift device is noticeably more cost-efficient. Effectively, the one-piece configuration of the locking lever and the cylindrical pin is inserted, in accordance with the invention, in the recess before impressing the boundary region around the recess for securing the cylindrical pin in place. These assembly steps may be automated for cost-savings reasons. The securement of the locking lever in accordance with the present invention results further in an increased shear strength as a consequence of a double-section connection, realized by projecting portions of the cylindrical pin on both sides of the locking lever.

According to another feature of the present invention, the cylindrical pin is received with play in the recess of the shift rocker to permit a swinging motion of the locking lever, and the impressions for securing the cylindrical pin in place are so implemented as to enable an unhindered rotation. However, it is also possible, as an alternative, to receive the cylindrical pin in fixed rotative engagement in the recess while inserting the cylindrical pin with play in a bore of the locking lever.

According to another feature of the present invention, the cylindrical pin is so inserted in a bore of the locking lever and held in position as to project from the locking lever on both sides at a same distance. In this manner, the cylindrical pin is operatively securely coupled to the locking lever and a tilting of the locking lever is prevented.

According to another feature of the present invention, the cylindrical pin may be a needle-shaped rolling element for insertion in the locking lever. This type of cylindrical pin can be made on a large scale in a cost-efficient manner at high accuracy and strength for combination with the locking lever.

Suitably, the recess is configured as an opening which traverses the shift rocker for insertion of the end region of the locking lever. Extending from both sides of the opening are sections of the recess of limited depth for receiving the ends of the cylindrical pin projecting out from both sides of the locking lever. This configuration of the recess simplifies the assembly because the locking lever is positioned by the cylindrical pin in this assembly position, when the locking lever is inserted in the recess, and it is only required to impress opposite boundary regions surrounding the recess.

According to another feature of the present invention, the recess may also be configured as an opening extending over the entire length of the cylindrical pin and made in a cost-efficient manner by punching through the shift rocker. The locking lever can be positioned in place in such a recess by providing several impressions, i.e. impressions on both sides of the opposite boundary regions. Suitably, after stamping the recess, the boundary regions may be impressed on the shift sleeve confronting side of the shift rocker. In this manner, the locking lever is oriented in place already when inserted in the recess and requires only a further impression of the boundary regions on the opposite side of the shift rocker for positioning the locking lever in place.

Suitably, the recess in the shift rocker and the attachment of the cylindrical pin are so configured that the locking lever is swingable at least about an angle of ≧10°.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
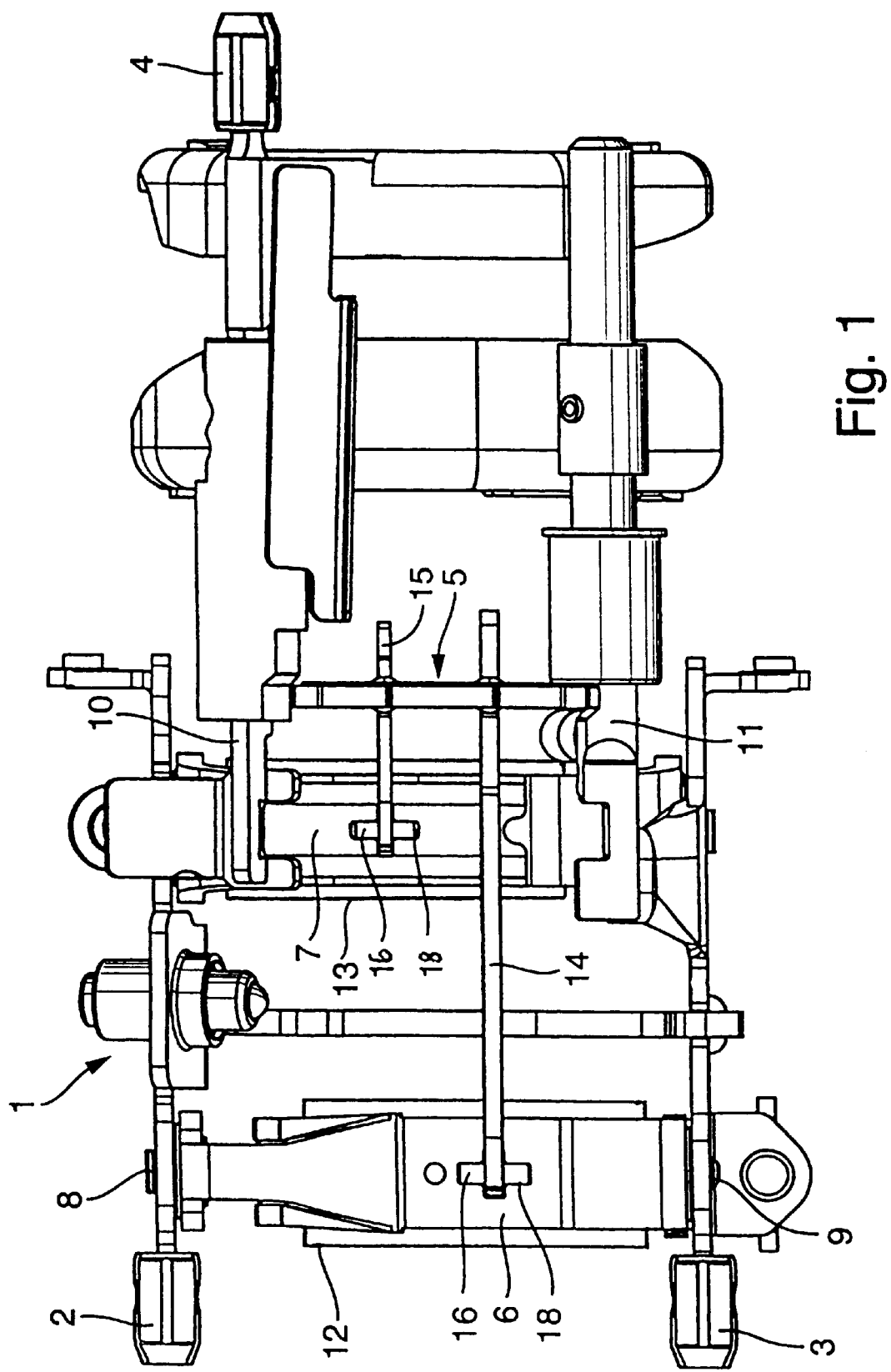
FIG. 1 is a plan view of an internal shift device according to the present invention.

Throughout all the Figures, same or corresponding elements are generally indicated by same reference numerals.

Turning now to the drawing, and in particular to FIG. 1, there is shown a plan view of an internal shift device according to the present invention, generally designated by reference numeral 1 and forming part of a change-speed gearbox. A specific construction and manner in which a switch device of this type is operatively and functionally incorporated into a change-speed gearbox is fully described in U.S. Pat. No. 5,802,916, the entire specification and drawings of which are expressly incorporated herein by reference.

The shift device 1 is held in receiving bores of a gearbox casing (not shown) via guide pins 2, 3, 4 and includes an input shaft (not shown) and coaxial thereto an output shaft (not shown), as well as a countershaft (not shown) in parallel disposition thereto. A plurality of shift rockers, only shift rockers 6, 7 are shown here by way of example, are used in the change-speed gearbox to axially displace shift sleeves 12, 13 that interact with gear wheel clutches (not shown) for optionally coupling either the input shaft with the output shaft or the countershaft, whereby a locking device, generally designated by reference numeral 5, is provided to lock those shift rockers that are non-activated. In the following description, the principles of the present invention will be explained with respect to the shift rockers 6, 7, although the numbers of shift rockers can certainly exceed two.

The shift rockers 6, 7 are swingably mounted in respective pivot bearings 8, 9 and actuated via shift rods 10, 11. Each of the shift rockers 6, 7 encompasses a shift sleeve 12, 13 which forms with further components a synchronizing unit, i.e. a gear wheel clutch of known design.

The locking device 5 is interconnected to the shift rocker 6 via a locking lever 14 and interconnected to the shift rocker 7 via a locking lever 15. The locking levers 14, 15 are made from a pre-punched flat band and have opposite axial ends, with one axial end swingably mounted to the respective shift rockers 6, 7, and with the other axial end positively engaged to the locking device 5. The interconnections of the locking device 5 to the shift rocker 6 and to the shift rocker 7 are substantially identical, and hence only the interconnection of the locking device 5 with the shift rocker 6 will hereinafter be described in detail, but the described principle is certainly equally applicable to the interconnection of the locking device 5 with the shift rocker 7.

The securement of the locking lever 14 to the shift rockers 6 is realized by a cylindrical pin 16, which is attached, preferably press-fitted, to the locking device distal end of the locking lever 14 and insertable in a recess 18 of the shift rocker 6, whereby the cylindrical pin 16 projects out from both sides of the locking lever 14, preferably, at a same distance. Thus, the locking lever 14 and the cylindrical pin 16 form, in effect, a single piece configuration. The recess 18 has a cross-shaped configuration and is so configured that its areas receiving the locking lever 14 are of greater dimension than the locking lever 14 in order to allow a pivoting of the locking lever 14 with respect to the shift rocker 6. Preferably, the cylindrical pin 16 is provided in the form of a needle-shaped rolling element.

Figure 2:
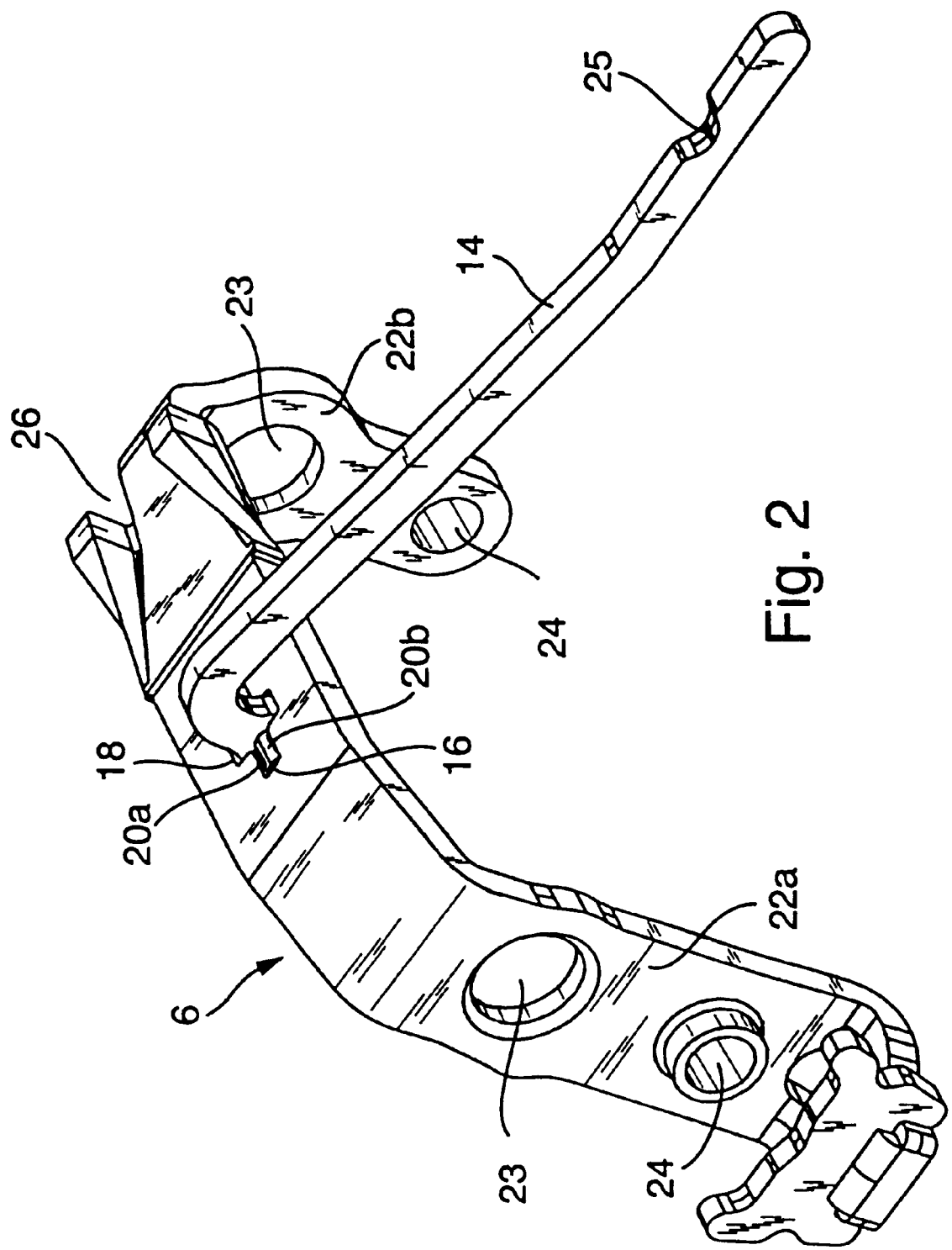
FIG. 2 is a perspective view, on an enlarged scale, of a shift rocker according to the present invention.

Turning now to FIG. 2, there is shown a perspective view of the shift rocker 6 on an enlarged scale. The shift rocker 6 has a generally U-shaped configuration with lateral legs 22a, 22b, also called "open-jawed shift walls". The legs 22a, 22b are formed with receiving bores 23 for insertion of trunnions (not shown) of the shift device 1 to form a pivot bearing for the shift rocker 6. Adjacent to its free end, each leg 22a, 22b includes a bushing 24 for receiving a journal (not shown) of the shift sleeve 12. The locking lever 14 is suitably bent or curved at its shift rocker proximal end and is pivotally mounted with play in the recess 18 via the cylindrical pin 16 which is so sized as to project outwards from both sides of the locking lever (only one side of the cylindrical pin 16 can be seen in FIG. 2). As a consequence of the curved end of the locking lever 14, there is no need to provide additional components to realize the attachment of the locking lever 14 to the shift rocker 6. At its other shift rocker distal end, the locking lever 14 is formed with a semicircular depression 25 for positive engagement to the locking device 5. The shift rocker 6 is further provided, offset to the securement of the locking lever 14 to the shift rocker 6, with a shift slot 26 for positive engagement of a shift finger (not shown).

In order to securely position the locking lever 14 with the cylindrical pin 16 in the recess 18, boundary regions 20a, 20b of the recess 18 are impressed, thereby pressing the cylindrical pin 16 and the shift rocker 6 together. The geometric arrangement and configuration of the impressions for fixation of the cylindrical pin 16 in the shift rocker 6 is shown in particular in FIG. 3, which is a plan view of the shift rocker 6. As a consequence of the impressions at the boundary regions 20a, 20b, the recess 18 is constricted to thereby securely hold the cylindrical pin 16 in place.

Figure 3:
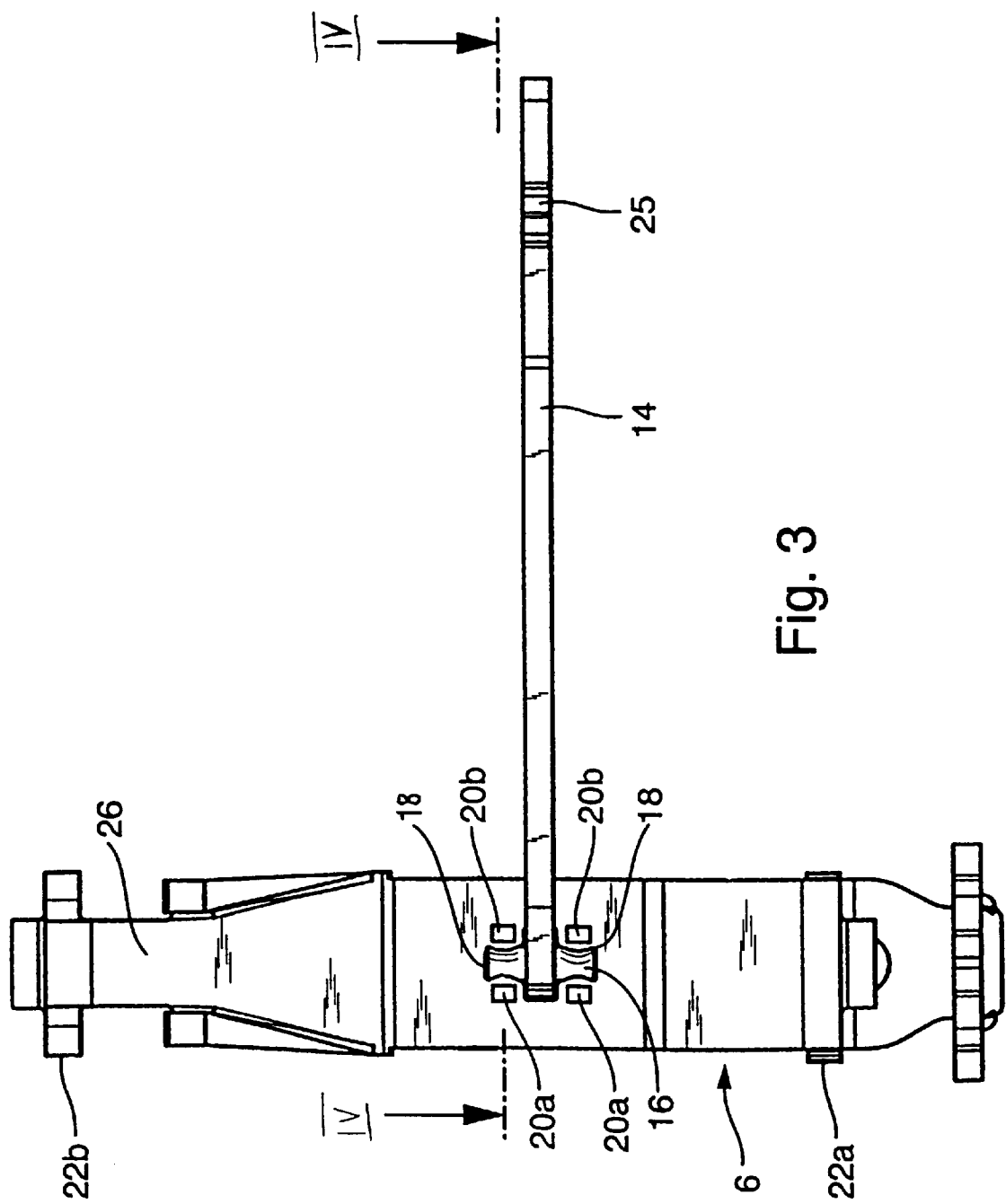
FIG. 3 is a plan view of the shift rocker.
Figure 4:
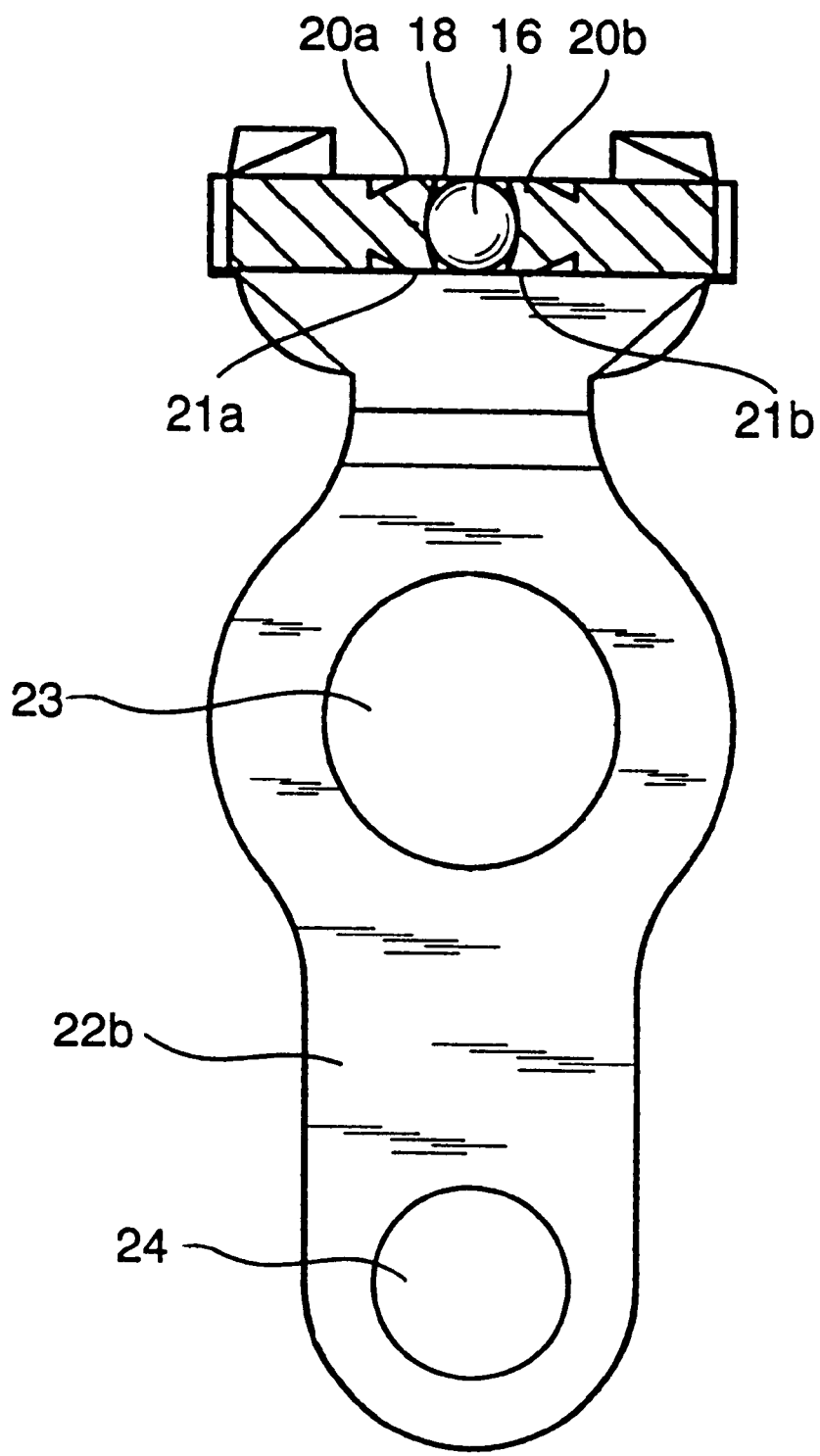
FIG. 4 is a partially sectional view, on an enlarged scale, of the shift rocker, taken along the line IV—IV in FIG. 3.

FIG. 4 is a partially sectional view, on an enlarged scale, of the shift rocker, taken along the line IV—IV in FIG. 3, and shown in particular the disposition of the cylindrical pin 16 in the recess 18 of the shift rocker 6. The recess 18 is suitably formed through punching through the shift rocker 6, with the cylindrical pin 16 being received in the recess 18. The cylindrical pin 16 and thus the locking lever 14 is secured with play in the recess and captivated by impressing the boundary regions 20a, 20b as well as boundary regions 21a, 2b of the recess 18 on both sides of the cylindrical pin 16. Suitably, the impressions are so configured at the boundary regions 20a, 20b, 21a, 21b as to prevent an unconstrained rotation of the cylindrical pin 16 and thus of the locking lever 14. As an alternative, it is also possible to retain the cylindrical pin 16 in rigid, fixed rotative engagement in the recess 18 and received with play in a bore of the locking lever 14.

While the invention has been illustrated and described as embodied in a locking lever for a shift rocker, it is not intended to be limited to the details shown since various modifications and structural changes may be made without departing in any way from the spirit of the present invention.

What is claimed is:

1. A shift device for a change-speed gearbox, comprising:
   a plurality of shift rockers rotatable between an activated position and a non-activated position, each shift rocker being supported in a pivot bearing and activated through operation of a shift finger, which is fixedly mounted on a shift shaft, for axially displacing shift sleeves;
   a locking unit; and
   a plurality of locking levers operatively connecting the locking unit to the shift rockers and so operated as to lock non-activated shift rockers, each said locking lever having one end exhibiting a curved configuration and terminating in a cylindrical pin for engagement in a recess of the associated shift rocker, said cylindrical pin being held in place within the recess by impressing boundary regions of the recess.

2. The shift device of claim 1 wherein the cylindrical pin is received in a bore of the locking lever such that the cylindrical pin projects out from both sides of the locking lever at a same distance.

3. The shift device of claim 1 wherein the cylindrical pin is a needle-shaped rolling element for attachment to the locking lever.

4. The shift device of claim 1 wherein the recess in the shift rocker has a cross-shaped configuration with a central entry opening for insertion of the one end of the locking lever, and portions extending on both sides of the entry opening of limited depth for receiving the cylindrical pin.

5. The shift device of claim 1 wherein the recess is configured as an opening in the shift rocker, which opening extends over the entire length of the cylindrical pin.

6. The shift device of claim 1 wherein the cylindrical pin is fixed on one side of the shift rocker by swaging or crimping opposite end regions of the recess.

7. The shift device of claim 1 wherein the cylindrical pin is secured on both sides of the shift rocker by indenting opposite end regions.

8. A locking device for locking a shift rocker of a shift device for a change-speed gearbox, said locking device comprising a locking lever having an elbow-shaped end portion which terminates in a cylindrical pin for engagement in a recess of a shift rocker, said cylindrical pin being captivated in the recess by impressing boundary regions of the recess.

9. The locking device of claim 8 wherein the cylindrical pin is press-fitted to the elbow-shaped end portion of the locking lever to form a structural unit.

10. The locking device of claim 8 wherein the recess of the shift rocker has a cross-shaped configuration, said cylindrical pin sized to project out from both sides of the locking lever at a same distance.

11. The locking device of claim 8 wherein the cylindrical pin is a needle-shaped rolling element.

12. The locking device of claim 8 wherein the impressing process includes swaging, crimping and indenting.

* * * * *